Figure 1:
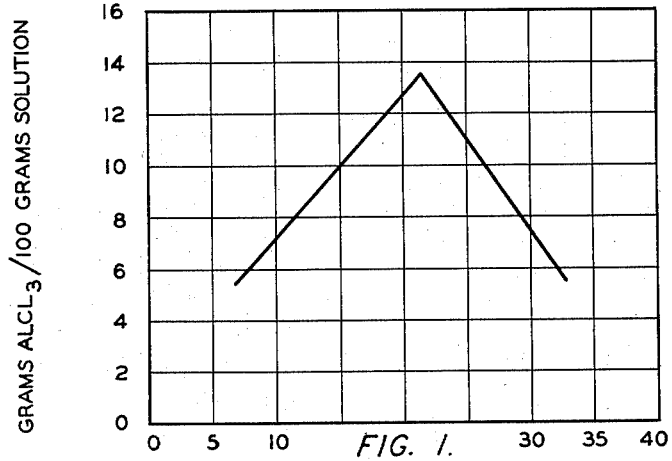

Dec. 26, 1950 J. L. GROEBE ET AL 2,535,735
METHOD OF REMOVING ALUMINUM HALIDES
IN HYDROCARBON CONVERSION PROCESSES
Filed Oct. 23, 1945 2 Sheets-Sheet 1

INVENTORS
J.L. GROEBE
E.F. DEVILLAFRANCA
BY
Hudson and Young
ATTORNEYS

Patented Dec. 26, 1950

2,535,735

UNITED STATES PATENT OFFICE 2,535,735

METHOD OF REMOVING ALUMINUM HALIDES IN HYDROCARBON CONVERSION PROCESSES

John L. Groebe, Phillips, Tex., and Edward F. de Villafranca, Bartlesville, Okla., assignors to Phillips Petroleum Company, a corporation of Delaware Application October 23, 1945, Serial No. 624,046

11 Claims. (Cl. 260—683.4)

This invention relates to a hydrocarbon conversion process. One aspect of this invention relates to the purification of fluid reaction effluents from hydrocarbon conversions carried out in the presence of an anhydrous normally solid or liquid metal halide of the Friedel-Crafts type which is volatilizable or soluble in the effluent, which effluents contain hydrocarbons, usually both the original and the product hydrocarbon in addition to any by-products, as well as metal halide. A more specific aspect of this invention relates to a process wherein the reaction effluent leaves the reaction zone in the vapor or liquid phase and is subjected to a purification treatment to remove therefrom the volatilized or dissolved metal halide catalyst contained therein. Another aspect of this invention relates to a process for the conversion of isobutane and ethylene into diisopropyl (2, 3-dimethyl butane).

One aspect of this invention is an improvement of the process for the production of diisopropyl as disclosed in the copending application of Ringham, Serial No. 556,208, filed September 28, 1944, now patent No. 2,409,389 issued October 15, 1946.

Aluminum halide catalysts and like catalysts have been used in numerous processes for the conversion of hydrocarbons, including decomposition or cracking of high-boiling hydrocarbons, isomerization of low-boiling hydrocarbons, polymerization of olefins, disproportionation, and alkylation of alkylatable hydrocarbons, including both isoparaffins, normal paraffins, cycloparaffins, and aromatic hydrocarbons. In such processes these catalysts have been used as such, suspended in or dissolved in a reaction mixture, suspended on solid supports such as active carbon, activated alumina or aluminous materials such as bauxite, active silica, and various clays such as fuller's earth, kieselguhr, etc., and as separate liquids in the form of complexes with organic and inorganic compounds. The more useful of the liquid complexes are those formed with paraffinic hydrocarbons, especially those formed with more or less highly branched, normally liquid paraffin hydrocarbons boiling in the boiling ranges of those fractions generally identified as gasoline and kerosene. In many instances it is desirable to have present a small amount of a hydrogen halide, sometimes only about 0.1 to about 1 to 5 per cent by weight. This material may be present as a result of side reactions, such as when water is present in a charge stock, when an organic halogen compound is present in a charge stock, when some interreaction between an aluminum halide and hydrocarbon takes place, or when a hydrogen halide is deliberately added.

At the present time, hydrocarbon conversions effected with the aid of aluminum chloride, or like metal halide catalysts, are characterized by numerous troubles including corrosion, further reactions, clogging of equipment, etc., caused by the catalyst permeating the entire system. These troubles are especially objectionable in those sections of the equipment which follow the conversion unit. Thus, where the effluent is removed in the vapor phase and where the catalyst is readily volatilizable, the effluent contains substantial quantities of vaporized catalyst, and heretofore this catalyst deposits in the equipment after the converter or reaction zone. Again, where the effluent is removed in the liquid phase, it contains substantial quantities of dissolved or suspended catalyst which causes difficulties in subsequent processing.

The principal object of this invention is to provide a process overcoming the foregoing difficulties.

Another object is to provide a convenient, economical, and highly satisfactory process of purifying the reaction effluents from hydrocarbon conversion processes.

Another object is to effect removal of a volatilized metal halide catalyst from vaporous effluents or a dissolved metal halide catalyst from liquid effluents from the reaction zone of a process using the metal halide as a catalyst.

It is still another object to remove a Friedel-Crafts metal halide from a gaseous or liquid stream.

Another object is to provide an improvement in a process for the production of diisopropyl.

Still another object is to provide specific conditions of operation for removing aluminum chloride from an effluent by contact with an alkali metal hydroxide solution.

Further objects and advantages will become apparent to those skilled in the art from the accompanying description and disclosure.

In accordance with this invention a Friedel-Crafts metal halide is removed from a fluid stream by contacting the same with an aqueous solution of an alkali metal hydroxide such as sodium or potassium hydroxide. In one embodiment, the effluent from the reaction zone of a hydrocarbon conversion process containing a metal halide, such as aluminum chloride, therein is contacted or washed with an aqueous solution of sodium hydroxide to remove the metal halide from the effluent whereby corrosion and clogging of subsequent equipment through which the effluent subsequently passes is prevented or minimized. Specifically, certain limits of initial concentration of the alkali metal hydroxide in the aqueous solution used to remove the metal halide from either a gaseous or liquid stream have been discovered and have heretofore been unknown and unpredictable. These limiting conditions, which quite unexpectedly show a maximum and minimum hydroxide concentration in the aqueous solution for optimum operation of the caustic washing process, will be discussed more fully hereinafter.

As used in this specification, caustic solution may be defined as an aqueous solution of an alkali metal hydroxide, and the caustic washing process is the scrubbing, washing or contacting of an effluent with such a solution.

The process may be operated in either a batchwise, continuous, or semi-continuous manner, this first being preferred. Thus, a vapor or liquid effluent leaving a continuously operated conversion zone may be continuously passed to a caustic washing step in which a caustic solution is being continuously recycled. When the caustic solution reaches the minimum concentration allowable, the spent solution is discharged from the caustic washing system and a fresh solution of the required quantity reintroduced into the system. The treated effluent is continuously passed in the vapor or liquid phase to subsequent equipment for further treatment.

The process of this invention is particularly applicable to the treatment of the effluent from the alkylation of isobutane with ethylene to produce diisopropyl (2, 3-dimethyl butane), a valuable blending ingredient for high octane gasolines. The invention is applicable to alkylation in general, as well as to various isomerization processes in which a Friedel-Crafts metal halide catalyst is used.

An example of another effluent which may be treated by the present invention is that effluent from the cracking of high-boiling petroleum oils to make gasoline in the presence of aluminum chloride or the like and hydrogen chloride.

The invention is preferably applied to a liquid effluent, such as the liquid effluent from the alkylation of isobutane with ethylene to produce diisopropyl in the presence of aluminum chloride-hydrocarbon liquid complex in a reaction zone. In such an application, the liquid effluent is contacted or washed with a sodium hydroxide solution; for example, in an absorber directly following the reaction zone.

It is well known that aluminum chloride may be dissolved in light liquid hydrocarbons and also in heavier liquid alkylates of such hydrocarbons. The conventional liquid complex catalyst employed in this alkylation of isobutane with ethylene to produce diisopropyl contains both bound and loosely bound or unbound aluminum chloride, the latter being the active ingredient of the catalyst. This active aluminum chloride is dissolved in the liquid hydrocarbon phase. In fact, since the liquid hydrocarbon phase contains heavy alkylate and perhaps some polymer, both of which are excellent for the preparation of the aluminum chloride hydrocarbon liquid complex used as the catalyst, it is probable that such hydrocarbons tend to produce catalyst by stripping or reacting with the aluminum chloride from the main catalyst phase. If this reaction were rapid resulting in immediate formation of the final liquid catalyst complex, the complex thus formed would settle with the catalyst phase within the reaction zone. This, however, is not the case, because the completed liquid complex requires considerable agitation and mixing time. Therefore, the aluminum chloride in the hydrocarbon alkylate effluent leaving the reaction zone or settling tanks following the reaction zone is in the process of being converted into a complex. This situation makes neutralization of the aluminum chloride very difficult because the individual granules of aluminum chloride are coated with an oil film which is immiscible and unreactive with the sodium hydroxide solution. Caustic washing is essential to neutralize the aluminum chloride, but because of the above facts, such neutralization is very difficult and in many instances requires extensive contacting equipment of high efficiency, such as two or three mixing pumps, or mixes in series.

Furthermore, once the hydrocarbon protective film is destroyed, the aluminum chloride hydrolyzes slowly before complete neutralization is achieved. It is very easy, therefore, for partially neutralized aluminum chloride to leave the caustic washing step unless adequate precautions are made to assure complete neutralization.

The above condition gives rise to phenomenon known to alkylation industry as delayed hydrolysis. This phenomenon results in severe corrosion and plugging of lines, valves, controls, and bubble plate columns in the downstream separation system. Aluminum chloride reacts with steel to form ferric chloride which is very corrosive. Thus it is essential that the caustic washing step be conducted under maximum efficiency conditions and the aqueous solution of alkali metal hydroxide, such as sodium hydroxide, must be at optimum strength for neutralizing aluminum chloride and dissolving any sodium chloride and Bayerite ($Al_2O_3 \cdot 3H_2O$) formed by the neutralization with sodium hydroxide. Any precipitation of sodium chloride or Bayerite will seriously impair the operation of the process. A dilute sodium hydroxide solution would also require almost infinite contact time and expensive high pressure equipment (400 p. s. i. or more).

In addition to optimum caustic washing it is desirable and usually essential to follow the caustic washing step with a coalescence step comprising passing the product stream through a solid supported contact bed which is operated downstream from the caustic washing step. Sand, gravel, quartz chips, etc., may be used as coalescing material, but lump or pulverized limestone is preferred. This arrangement completes any hydrolysis reaction by providing extensive contact surface. Furthermore, any finely suspended caustic droplets or aluminum chloride complex with caustic is coalesced to a liquid phase and may be drained from the bottom of the vessel containing the contact bed.

Figure 2:
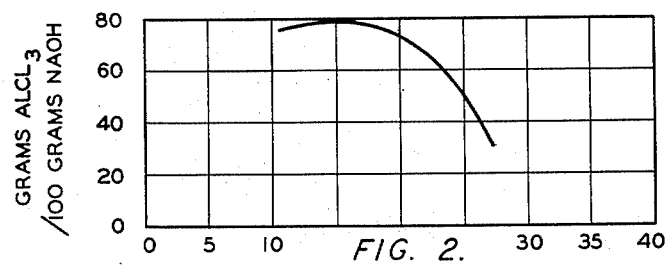
Figure 3:
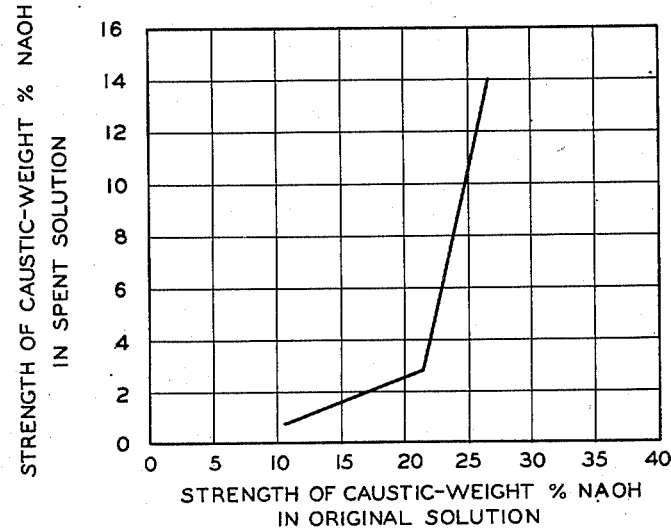

Figures 1, 2, and 3 of the drawings show the optimum initial concentration of sodium hydroxide in an aqueous solution to be used for the removal of aluminum chloride from a gaseous or vaporous hydrocarbon stream by conversion to the AlCl₃ equivalent.

The curve of Figure 1 was plotted from data in column 1 of Table I. The curves of Figures 2 and 3 were plotted from columns 2 and 3 of Table I, respectively.

Table I.

| Initial Concentration of Per Cent NaOH in Solution | Composition of Aqueous Solution When Precipitation Occurs | | |
|---|---|---|---|
| | (1) Wt. % NaCl | (2) Gms. AlCl₃/100 Gms. NaOH | (3) Wt. % NaOH in Spent Solution |
| 10.6 | 9.9 | 77 | 0.8 |
| 17.7 | 15.0 | 72 | 2.3 |
| 21.5 | 17.8 | 73 | 2.7 |
| 23.6 | 15.8 | 58 | 7.3 |
| 24.8 | 14.9 | 52 | 9.4 |
| 27.0 | 12.7 | 40 | 14.0 |

According to Figure 1, the maximum solubility of aluminum chloride in a given quantity of sodium hydroxide solution will occur with initial or original concentration of sodium hydroxide in an aqueous solution at about 21.5 per cent by weight, or 11 mol per cent. In one respect this means that when a fixed quantity of caustic solution is used, i. e., 10,000 gal., that this initial concentration of sodium hydroxide in the original quantity of solution should be approximately 21.5 weight per cent in order that it may react with the maximum quantity of aluminum chloride before precipitation of sodium chloride occurs in the contacting equipment. Of course, when precipitation occurs, the spent solution is no longer used but is replaced with a fresh batch of caustic solution.

According to Figure 2, the maximum utilization of sodium hydroxide will occur when the original caustic solution contains approximately 16 weight per cent, or about 8 mol per cent, sodium hydroxide. This means that in consideration of the cost of sodium hydroxide only, the aforesaid strength of solution should be used in order to obtain the maximum utilization per dollar expended for hydroxide. However, if this strength of caustic solution is used, Figure 1 indicates that only 78 per cent as much aluminum chloride will be dissolved in a fixed quantity or in one charge of such caustic solution before precipitation occurs as compared with a sodium hydroxide concentration of 21.5 weight per cent. Therefore, the 16 weight per cent caustic solution will have to be dumped or replaced more frequently, necessitating additional labor costs and interruption of operations. These two items must necessarily be balanced against savings in sodium hydroxide which will occur with the 16 weight per cent solution.

Figure 3 shows that the residual strength of the spent caustic solution decreases rapidly as the initial concentration of sodium hydroxide in the original caustic solution is decreased from about 27 to 21.5 weight per cent. After this point is reached, the rate of decline is less rapid and the limiting point in this direction, of course, is the minmum concentraton of sodium hydroxide required to perform the desired treating operation without excessive contacting or mixing equipment. In commercial installations it is not economical to entertain installation of sufficient pumps or mixers and settling tanks to achieve good treating efficiency with the concentration of sodium hydroxide much less than 2 per cent by weight (0.9 mol per cent). Consequently, the use of an initial concentration of sodium hydroxide much less than 16 weight per cent is also undesirable for the above reason. It can be seen from Figure 3 that when starting with sodium hydroxide solution of a strength lying in the range of 8 to 11 mol per cent (16–22 wt. per cent), the amount of caustic in the spent solution lies in the range of 1.8 to 2.8 per cent by weight.

When all factors are considered, preferred or optimum operating conditions obtain when the original or initial concentration of sodium hydroxide in the caustic solution is in a range between about 16 and about 21.5 or 22 per cent by weight, or between about 8 and about 11 mol per cent. At the high value end of this range the cost of the sodium hydroxide for a given treating operation will be slightly higher but the frequency of change and therefore the operating labor will be at a minimum. At the low value end of this range the cost of sodium hydroxide will approach a minimum whereas the operating labor at interruption of operation will be slightly increased.

The temperature used in the purification treatment may vary widely. Where a vaporous effluent is being treated, it is preferred to use temperatures sufficiently high that condensation of the hydrocarbons being treated is prevented but below about 200° F. However, it is perfectly possible when treating vaporous effluent, to operate the caustic washing step at a temperature such that condensation, partial or complete, of the hydrocarbon effluent takes place. As will be understood, whether condensation takes place or not, and if so, to what extent depends also upon the pressure maintained in the caustic washing step. Ordinarily this pressure will be substantially the same as that in the conversion step although it may be materially higher or lower than that pressure by the use of suitable pressure increasing means (e. g. a pump or compressor) or pressure reducing means between the catalytic converter and the absorber.

The absorber or washing unit may, if desired, function as a cooler and/or a quencher for the vaporous effluent where the vapors are at a substantially higher temperature than the caustic solution. Thus the quenching, i. e., rapid cooling of the hot reaction effluent, may serve to prevent reactions between the reaction products, etc.

Where a vaporous effluent is treated in the absorber or washing unit in such manner that condensation of hydrocarbons contained in the effluent occurs, layer separation is allowed to take place, preferably continuously in any suitable manner obvious to those skilled in the art. The aqueous phase is separated from the lighter hydrocarbon phase by gravity.

Where a liquid reaction effluent is treated with a caustic solution in accordance with the invention, the treatment may be conducted at any temperature ranging from the freezing point of the effluent or caustic solution to about 200° F. The treatment may be conducted in any apparatus known to be suitable for intimate liquid-liquid contacting, following which the separation of phases is made and the two separated phases further processed as desired.

A preferred embodiment of my invention will now be discussed in some detail in connection with the accompanying drawings which form a part of this application and which show an arrangement of apparatus suitable for practicing the invention. While various features of the invention will be discussed in connection with the reaction of isobutane and ethylene to produce diisopropyl in the presence of an aluminum chloride-hydrocarbon liquid complex as the catalyst, it is to be understood that the invention can be applied to other reactants and to other Friedel-Crafts metal halide type catalysts.

Figure 4:
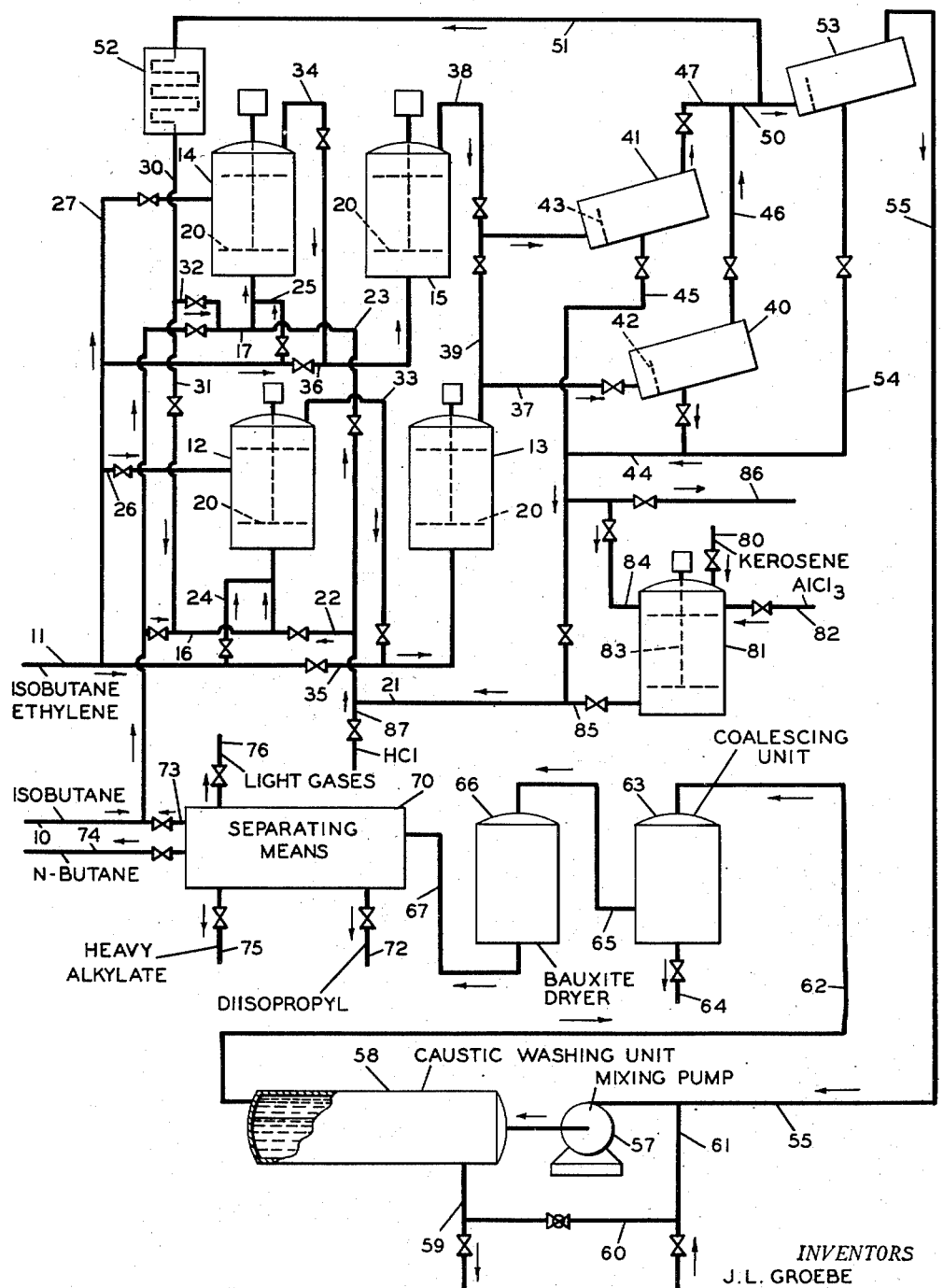

Referring now to Figure 4 an isobutane stream is passed to the process through line 10 and a mixture of isobutane and ethylene is passed to the process through line 11. As will be appreciated by those skilled in the art in a commercial plant these hydrocarbons will be accompanied by comparatively small amounts of other hydrocarbons. Such hydrocarbons, however, should be present in relatively small amounts, particularly when they are also reactive under the reaction conditions. The alkylation reaction is conducted in four reactors—12, 13, 14, and 15—with reactors 12 and 13 being operated in series and reactors 14 and 15 being operated in series, the first said set of reactors being operated in parallel to the second set of reactors. More than two such sets of reactors may, of course, be used if desired. Contents of each reactor are intimately admixed by means of a stirrer 20. The isobutane stream is passed through lines 16 and 17 in two portions to the bottom of each of reactors 12 and 14, which are the primary reactors in each set. A catalyst stream from a common catalyst source, such as line 21, is passed in two portions through lines 22 and 23 to the bottoms of reactors 12 and 14. This catalyst stream comprises used and fresh catalyst. The isobutane-ethylene stream is split into six portions. To the bottom of each of the primary reactors 12 and 14 is added one of these portions through lines 24 and 25. To the middle of each of the two primary reactors 12 and 14 is added another portion through lines 26 and 27. A recycled portion of the hydrocarbon effluents of the reaction is passed through line 30 and divided into two portions which are passed through lines 31 and 32, each portion also being added to the bottom of the primary reactors 12 and 14.

A preferred reaction temperature for this conversion is between about 50 and about 200° F., preferably about 80 to about 150° F. When alkylating hydrocarbons, the activity of the catalyst herein described is sufficiently high that even ethylene undergoes rapid reaction within this temperature range. It is generally preferred to operate under a pressure such that the hydrocarbons are present in the reaction zone substantially in liquid phase and in many instances the hydrocarbon material will be kept in completely liquid phase under the preferred reaction conditions. The flow rate of reactants to the reaction zone is preferably expressed in terms of amount of product produced, and when reacting isobutane with ethylene to produce diisopropyl we prefer to operate at flow rates between about 0.2 and about 1.5 gallons of total alkylate produced per gallon of catalyst present in the reactor per hour. Thus, when reacting isobutane and ethylene in a reactor having a total internal volume of 1,000 gallons and with a hydrocarbon to catalyst ratio within the reactor of 3:2 and a flow rate of 1.25 gallons of alkylate per gallon of catalyst per hour, 500 gallons of alkylate are produced per hour.

It is preferred to have a volume ratio of hydrocarbons to catalyst in the reaction zone between about 9:1 and about 1:1 and the preferred ratio has been found to be about 3:2. When the reaction mixture is maintained intimately admixed with the catalyst under the preferred conditions, the hydrocarbon phase is the continuous phase. Under these conditions the catalyst readily separates from the hydrocarbons and power requirements in order to maintain a suitable intimate admixture are not excessive. However, when a greater amount of catalyst is used, it has been found that a phase inversion may take place with the result that the catalyst phase is the continuous phase and the hydrocarbon phase the discontinuous phase, which is not nearly so satisfactory. Under such conditions it is quite difficult to obtain adequate physical separation between the hydrocarbon phase and the catalyst phase and a considerable amount of power is required in order to adequately mix hydrocarbons and catalyst charged to the reaction zone.

As the mixture of reactants and catalyst passes up through the primary reactors it is thoroughly admixed so that the catalyst is present in extremely small particles. From the top of each of the primary reactors this intimate admixture is passed, through lines 33 and 34, to the bottom of the corresponding secondary reactor. At this point the final two portions of the isobutane-ethylene mixture are added through lines 35 and 36. The hydrocarbon-catalyst mixture is also intimately admixed in the secondary reactors 13 and 15 to effect suitable reaction. The resulting admixtures are passed through lines 37 and 38 to corresponding primary settlers 40 and 41. These settlers are preferably vessels set on a slope with a solid baffle plate 42 and 43 near the inlet and extending about halfway up in the tank. This baffle plate serves to distribute the incoming emulsion across the tank section, thereby tending to reduce the shortcircuiting effect, and also serves as a retainer wall for the catalyst which settles out. The liquid catalyst which settles out is removed through lines 44 and 45 and combined to form a common catalyst source in line 21. A line 39 is provided joining effluent lines 37 and 38 for use in case of emergency if one of the settling tanks 40 or 41 needs to be taken out of service. Ordinarily this line 39 will not be used.

From the top part of settling tanks 40 and 41 a hydrocarbon mixture is passed through lines 46 and 47 and is combined in line 50. A substantial portion of this combined hydrocarbon material is passed through line 51 to cooler 52 and is returned to the reactors through line 30 as previously discussed. Since this combined hydrocarbon material still contains a small amount of entrained catalyst, generally, however, not more than about two or three to about eight or ten per cent of the total catalyst, the remaining portion is passed to a secondary settler 53. Since the catalyst which is still present in the hydrocarbon material is quite finely divided and represents the finely divided particles present in the emulsion passed from the secondary reactors through lines 37 and 38, a somewhat longer settling time is necessary in settler 53 than was used in either settlers 40 or 41. Catalyst which separates out is passed through line 54 for admixture with the catalyst removed through pipes 44 and 45.

A liquid hydrocarbon material substantially free from catalyst complex but containing unreacted hydrocarbons, alkylate, and some dissolved or entrained aluminum chloride is treated for removal of the dissolved aluminum chloride and other acid material. The hydrocarbon effluent from settler 53 is passed through line 55 to caustic washing unit 58 where it is contacted with an aqueous solution of sodium hydroxide as previously described to remove the aluminum chloride, etc. Washing unit 58 contains a fixed quantity of aqueous solution which is recycled through lines 59, 60 and 61 to line 55 and through mixing pump 57. The hydrocarbon effluent and caustic solution are intimately mixed in pump 57 and then passed to washing unit 58 for further contact and liquid phase separation. The initial concentration of sodium hydroxide in the aqueous solution is about 21.5 weight per cent. After use the concentration of sodium hydroxide decreases, and finally the aqueous solution becomes saturated with neutralization products, such as sodium chloride and Bayerite. When the caustic solution becomes saturated and precipitation begins, the spent caustic solution is discharged from the system through line 59 and a fresh quantity of solution introduced into the system through line 61. Water and caustic or additional caustic solution may be continuously or intermittently added through line 61 during the washing process while a portion of the caustic solution is withdrawn through line 59 in a similar manner. However, a completely continuous process is difficult and ordinarily the caustic solution is discharged after a certain amount of use. Preferably, a batch caustic washing process is operated rather than a continuous process but the concentration of sodium hydroxide is initially within the range of about 16 and 22 weight per cent, or 8 and 11 mol per cent.

A washed hydrocarbon effluent substantially free from aluminum chloride and acid material is removed from washing unit 58 and passed through line 62 to coalescing unit 63 comprising a solid supported bed of limestone. Entrained caustic, etc., is coalesced as previously discussed and removed from coalescing unit 63 through line 64. Hydrocarbon material is passed from coalescing unit 63 through line 65 to bauxite dryer 66 to remove traces of water dissolved or entrained in the hydrocarbon material.

From dryer 66 hydrocarbon material is passed through line 67 to separating means 70, which represents a series of fractionators or other similar equipment for separating the hydrocarbon components from the hydrocarbon material. A diisopropyl fraction is separated and removed through line 72 as a product of the process. Unreacted isobutane is separated and returned to the process through line 73. Normal butane, which will include that initially accompanying the charge stock and any normal butane formed by isomerization during the alkylation process, may be separated and discharged through line 74. One or more other alkylate fractions may also be recovered, as through line 75. Any undesired light gases may be discharged through line 76.

In making the original batch of catalyst, kerosene or other hydrocarbon may be added through line 80 to a catalyst preparation vessel 81 and an aluminum halide such as aluminum chloride may be added through line 82. These materials may be intimately admixed by means of a stirring mechanism 83. After the process has been started the activity of the recirculated catalyst may be maintained by passing a portion of the recirculated catalyst through line 84 to vessel 81 wherein aluminum chloride, either as such or as a high-aluminum chloride complex such as previously discussed, may be intimately mixed with it. The resulting fortified catalyst is passed through line 85 and returned to pipe 21 wherein it is mixed with the recirculated catalyst. Since such treatment tends to increase the total volume of catalyst available it will generally be found necessary to maintain a desired volume of catalyst by withdrawal of material from line 84 through line 86. When it is desired to use a hydrogen halide in preparing the catalyst such material may be added through either of lines 80 or 82. In such instances it is often not necessary to add hydrogen halide to the reaction system. However, if it is found desirable at any time to add a hydrogen halide to the reaction system, any desired portion may be added through line 87 to the catalyst present in line 21.

While an aluminum halide, namely either aluminum chloride, bromide or very infrequently, iodide, is most commonly used as the catalyst in carrying out our invention, other metal halides of the Friedel-Crafts type and which are normally either liquid or solid, usually the latter, may be used. Examples are the chlorides, bromides or iodides of the following metals:

Zinc
Tin
Arsenic
Antimony
Zirconium
Titanium
Iron
Boron
Beryllium

Although this invention has been described with particular reference to hydrocarbon conversion processes, especially the alkylation of isobutane with ethylene to produce diisopropyl, the optimum conditions of operating a caustic washing process are equally applicable to the removal of a metal halide from any gaseous or liquid stream composed of substantially inert material. It will be understood that various modifications may occur to those skilled in the art in the detailed embodiments described above without departing from the scope of the invention.

We claim:

1. In a hydrocarbon conversion process wherein conversion is effected in the presence of an aluminum chloride catalyst and wherein a vaporous effluent from a reaction zone contains a minor amount of aluminum chloride, the improvement which comprises contacting said vaporous effluent containing aluminum chloride with an aqueous solution of sodium hydroxide of an initial concentration between about 8 and 11 mole per cent at a temperature below 200° F. under conditions such that said vaporous effluent is rapidly cooled and condensed and a substantial portion of said aluminum chloride is removed, continuing the contacting with additional effluent at gradually decreasing concentration of sodium hydroxide in said solution as reaction with metal halide progresses until the stage of imminent precipitation is reached, and thereafter replacing the spent caustic solution with fresh solution of the aforesaid concentration.

2. In a process for the alkylation of isobutane with ethylene to produce diisopropyl comprising passing ethylene and isobutane to a reaction zone in the presence of an aluminum chloride alkylation catalyst under alkylation conditions such that diisopropyl is produced and separating diisopropyl from the resulting effluent as a product of the process, the improvement which comprises contacting said resulting effluent containing aluminum chloride with a solution of alkali metal hydroxide of an initial concentration in the range of 8 to 11 mol per cent, and continuing the contacting with additional effluent at gradually decreasing concentration of alkali metal hydroxide as reaction with aluminum chloride progresses, whereby aluminum chloride is removed from the effluent with optimum utilization of alkali.

3. The process of claim 2 wherein said alkali metal hydroxide is sodium hydroxide.

4. In a hydrocarbon conversion process wherein conversion is effected in the presence of an aluminum chloride catalyst and wherein an effluent from the reaction zone contains a minor amount of aluminum chloride, the improvement which comprises contacting said effluent containing aluminum chloride with an aqueous solution of sodium hydroxide of an initial concentration in the range of 16 to 22 per cent by weight, continuing the contacting with additional effluent at gradually decreasing concentration of sodium hydroxide in said solution as reaction with aluminum chloride progresses whereby aluminum chloride is removed from the effluent with optimum utilization of alkali, and replacing the spent caustic solution with fresh solution of the aforesaid concentration when the spent solution contains an amount of sodium hydroxide in the range of 1.8 to 2.8 per cent by weight but before precipitation occurs.

5. The process of claim 4 in which the initial concentration of sodium hydroxide is about 11 mol per cent.

6. The process of claim 4 in which the initial concentration of sodium hydroxide is about 8 mol per cent.

7. In a hydrocarbon conversion process wherein conversion is effected in the presence of a Friedel-Crafts type metal halide catalyst and wherein an effluent from a reaction zone contains a minor amount of the metal halide, the improvement which comprises contacting said effluent containing the metal halide with an aqueous solution of an alkali metal hydroxide of an initial concentration in the range of 8 to 11 mol per cent, continuing the contacting with additional effluent at gradually decreasing concentration of alkali metal hydroxide in said solution as reaction with metal halide progresses until the stage of imminent precipitation is reached, and thereafter replacing the spent caustic solution with fresh solution of the aforesaid concentration.

8. The process of claim 7 in which said metal halide catalyst is an aluminum chloride-hydrocarbon complex.

9. The process of claim 7 wherein the contact of said effluent with said aqueous solution is in the liquid phase.

10. The process of claim 7 wherein said alkali metal hydroxide is sodium hydroxide.

11. The process for removing aluminum chloride from a relatively inert liquid material which comprises contacting said relatively inert material containing aluminum chloride with an aqueous solution of sodium hydroxide of an initial concentration in the range of 8 to 11 mol per cent, continuing the contacting with additional effluent at gradually decreasing concentration of alkali metal hydroxide in said solution as reaction with metal halide progresses until the stage of imminent precipitation is reached and thereafter replacing the spent caustic solution with fresh solution of the aforesaid concentration.

JOHN L. GROEBE.
EDWARD F. DE VILLAFRANCA.

REFERENCES CITED

The following references are of record in the file of this patent:

UNITED STATES PATENTS

| Number | Name | Date |
|---|---|---|
| 2,304,290 | Peski | Dec. 8, 1942 |
| 2,313,660 | Montgomery | Mar. 9, 1943 |
| 2,320,293 | Ostergaard | May 25, 1943 |
| 2,340,600 | Lamb et al. | Feb. 1, 1944 |
| 2,363,264 | Rosen | Nov. 21, 1944 |
| 2,407,873 | Evering et al. | Sept. 17, 1946 |
| 2,433,482 | Roberts | Dec. 30, 1947 |

Certificate of Correction

Patent No. 2,535,735                                  December 26, 1950

JOHN L. GROEBE ET AL.

It is hereby certified that error appears in the printed specification of the above numbered patent requiring correction as follows:

Column 4, line 29, for "mixes" read *mixers*; column 5, lines 1 and 2, strike out "by conversion to the $AlCl_3$ equivalent" and insert the same after "Table I" and before the period, in line 4;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*